O. NARUM.
EYEGLASSES.
APPLICATION FILED FEB. 1, 1919.
1,394,109.
Patented Oct. 18, 1921.
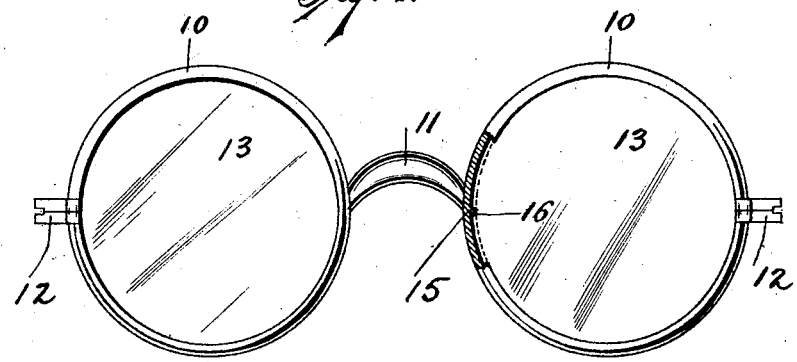
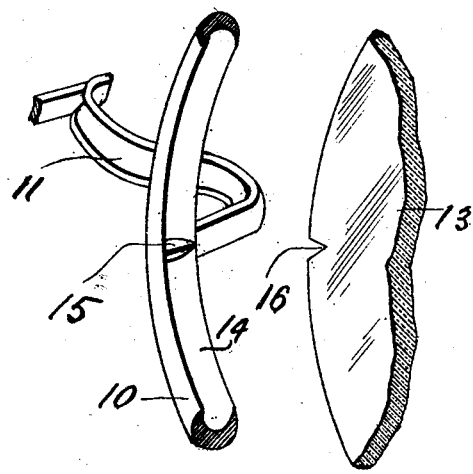
Inventor
Otto Narum
by Chas J Williamson
Atty.

UNITED STATES PATENT OFFICE.

OTTO NARUM, OF STAUNTON, VIRGINIA.

EYEGLASSES.

1,394,109.  Specification of Letters Patent.  Patented Oct. 18, 1921.

Application filed February 1, 1919. Serial No. 274,545.

*To all whom it may concern:*

Be it known that I, OTTO NARUM, of Staunton, in the county of Augusta, State of Virginia, have invented a certain new and useful Improvement in Eyeglasses, and do hereby declare that the following is a full, clear, and exact description thereof.

Eyeglasses and spectacles are much in vogue, in which the lenses are perfectly round, or circular. It is of vital importance with some lenses,—those for astigmatism, for example, which are cylindrical,—that the axis of inclination or angle be fixed, and experience has shown that the friction from the mere clamping action of the round rim on round lens is not to be depended on, for there is liability of the glasses turning, and thus changing disastrously to the wearer, the angle of the axis. The object of my invention is to overcome this serious defect in rims for round lenses and to do so by means which will not impair the lens or weaken the delicate rims, will be inconspicuous and inexpensive. My invention, therefore, consists in means substantially as hereinafter claimed.

In the annexed drawings:

Figure 1 is a front view of a pair of spectacles, embodying my invention:

Fig. 2 is a perspective view of a portion of the rim and a portion of the lens, separated from each other, and much enlarged.

To illustrate one embodiment of my invention, I show a spectacle frame that comprises a pair of circular rims 10, joined by a bridge 11, and each divided, or split at a point diametrically opposite where the bridge joins it, where are the lugs 12 to receive the screw that clamps the rim upon the inclosed lens 13 and for attaching the usual temple. The rims are grooved or channeled on their inner periphery to receive the circumferential edge of the lens, and provide an overhanging flange on opposite faces thereof to retain the lens in the rim. In the groove or channel 14 with which the rim is thus provided, I form or provide a rib or lug 15 which extends from one side or flange to the other, and in the circumference of the lens, I cut or form a notch or nick 16 adapted to fit upon said lug, and thereby the lens is infallibly fitted in place in the right position, and it cannot accidentally be turned from such position. I locate said rib preferably adjacent the point of connection of the bridge with the rim, and, hence, diametrically opposite the place of division or split of the rim; and it does not project beyond the groove, so that when the lens is in place in the rim, neither the lug nor the lens nick is visible and the appearance of the glasses is no different from those having no such device.

I, of course, do not restrict my invention to use in spectacles; nor to any particular material for the frames or rims, since, in its broadest aspect, my invention is a framed eyeglass, whether pince-nez or spectacle and whatever be the frame material, having round or circular rims and lenses, and coacting formations of rim and its encircled lens by which the lens is positively held from turning.

What I claim is:

A framed eyeglass having a circular rim and lens, and coacting formations of rim and lens that positively hold the lens from turning in the rim, the rim having a channel that receives the circumference of the lens, and having in said channel a rib, the lens having in its periphery a notch that fits said rib, the rib being split on the side opposite said notch and rib.

In testimony that I claim the foregoing I have hereunto set my hand.

OTTO NARUM.